United States Patent [19]

Hatsugai et al.

[11] Patent Number: 4,590,083

[45] Date of Patent: May 20, 1986

[54] PROCESS FOR PRODUCING RAPID-COOKING NOODLES

[75] Inventors: Satoshi Hatsugai, Fussa; Yoshiaki Kawabata, Ranzanmachi; Akira Fujiwara, Mitaka; Hisashi Kojima, Tokyo; Haruo Harada, Mitaka; Kesayoshi Kudo, Musashino; Shinya Ohara, Kokubunji, all of Japan

[73] Assignee: Myojo Foods Co., Ltd., Tokyo, Japan

[21] Appl. No.: 538,266

[22] Filed: Oct. 3, 1983

[30] Foreign Application Priority Data

Oct. 2, 1982 [JP] Japan .................. 57-173575

[51] Int. Cl.$^4$ ............................ A21L 1/16
[52] U.S. Cl. ..................... 426/557; 426/438
[58] Field of Search .......... 426/557, 654, 511

[56] References Cited

U.S. PATENT DOCUMENTS

| | | | |
|---|---|---|---|
| 4,098,906 | 7/1978 | Hisaki et al. | 426/451 |
| 4,229,488 | 10/1980 | Suggs et al. | 426/654 |
| 4,315,041 | 8/1982 | Fukuda et al. | 426/654 |
| 4,370,352 | 1/1983 | Murakami et al. | 426/557 |

FOREIGN PATENT DOCUMENTS

| | | | |
|---|---|---|---|
| 48-4532 | 4/1969 | Japan | 426/557 |
| 4724134 | 7/1972 | Japan | 426/557 |

OTHER PUBLICATIONS

Doerfort, "Distilled Monoglycerides", reprinted from Food Engineering, Nov. 1962, Rochester, N.Y.

*Primary Examiner*—Raymond N. Jones
*Assistant Examiner*—Elizbeth A. King
*Attorney, Agent, or Firm*—Oblon, Fisher, Spivak, McClelland & Maier

[57] ABSTRACT

Rapid-cooking noodles can be prepared by adding to a powder mix of necessary ingredients an edible emulsifier which is solid at room temperature and/or an edible oil or fat which is also solid at room temperature, and mixing the two components. When the noodles is immersed in boiling water, they become ready to eat within a period of from 1 minute at the shortest to 2 minutes at the longest.

8 Claims, No Drawings

PROCESS FOR PRODUCING RAPID-COOKING NOODLES

BACKGROUND OF THE INVENTION

The present invention relates to a process for producing rapid cooking noodles such as Japanese dried noodles (referred to as "Udon", "Soba", "Hiyamugi" or "Sōmon" in Japanese), instant oriental or Chinese noodles, macaroni and the like, boiled noodles and thin skin noodles by incorporating in a mix of necessary ingredients an edible emulsifier which is solid at room temperature and/or an edible fat or oil which is also solid at room temperature. The noodles produced by this process are characterized by strands that separate from each other very easily and can be reconstituted into the ready-to-eat state very quickly without sacrificing the noodle's palatability.

DESCRIPTION OF THE PRIOR ART

The palatability of noodles is primarily determined by their mouth-feel properties such as elasticity, smoothness and glutenousity. These properties determine the extensibility and body of the noodles and largely depend on the method of production and the thickness of noodle strands. The time necessary for reconstituting the noodles is closely related to their thickness, and as is well known, the thicker the strands, the longer the time required to reconstitute the strands. To give guide figures, thicker strands (1.7 mm) require about 15 minutes for reconstitution; thinner strands (1.4 mm) take about 12 minutes; snack Udon noodles (1.0 mm) need about 5 minutes; and snack oriental noodles (0.8 mm) require about 3 minutes.

In order to meet the demand, especially of younger people for foods that can be eaten at any place without waiting long, considerable efforts have been made to reduce the time necessary for reconstituting instant noodles into the ready-to-eat state. Needless to say, the reduction in the reconstitution period should not be made at the expense of the palatability of noodles. One conventional method for attaining this object is to add starch to a wheat flour mix and reduce the relative protein content of the noodle product while gelatinizing the starch content to a higher extent. However, this method has the following defects. For one thing, the starch swells and gelatinizes excessively upon steaming and uniform gelatinization is prevented by the sticking of individual noodle strands. Furthermore, in addition to the reduced productivity of noodles, strands do not easily separate from each other upon pouring of boiling water, and uniform reconstitution of the strands becomes impossible. A method has been proposed for reducing the reconstitution period by making the strands porous with bubbles of a leavening agent. However, this method fails to produce smooth, elastic and palatable noodles because the bubbles of a leavening agent are destructive to the texture of strands. In another attempt, bubbles are introduced into strands by making a noodle sheet with a reduced number of rollers or with less powerful rollers. But this method does not produce elastic noodle strands and the product easily gets slack or flaccid after reconstitution with boiling water. The technique of cutting streaks in noodle strands is reasonably effective for the product which needs a longer reconstitution period but is virtually effective for thin strands. Conventional instant noodles can be reconstituted into the ready-to-eat state by leaving them for a period of 3 to 5 minutes after pouring boiling water, and this period cannot be shortened further by any of the conventional techniques.

SUMMARY OF THE INVENTION

As a result of various studies to reduce the reconstitution period of instant noodles which is already as short as 3 to 5 minutes, the present inventors have found that this object can be attained by adding to a wheat flour mix an emulsifier which is solid at room temperature and/or an oil or fat which is also solid at room temperature. When strands of an intimate mixture of the flour mix and the solid emulsifier or fat (or oil) prepared by the conventional method are steamed and dried by blowing of hot air or dehydrated by frying, many tiny holes are formed on or within the strands and at the same time, very few strands stick to each other. As a result, the strands separate from each other as soon as boiling water is poured in, and they are reconstituted into the ready-to-eat state within a period which is half to one third of the conventionally required period. Furthermore, the resulting noodles are more elastic and smooth and have a greater soup acceptance than the conventional product. The present invention has been accomplished on the basis of this finding and provides a process for producing easily separable noodles with many tiny holes from a flour mix that contains, in addition to the conventional ingredients, an edible emulsifier which is solid at room temperature and/or an edible oil or fat which is also solid at room temperature. The noodles produced by this process can be reconstituted very rapidly without sacrificing their palatability.

DETAILED DESCRIPTION OF THE INVENTION

According to the process of the present invention, wheat flour or a powder mix which is primarily made of wheat flour and contains cereal meals or starch is mixed with known noodle dough conditioners, food additives, seasonings and water, as well as 0.2 to 3 wt % of an edible emulsifier which is solid at room temperature and/or 0.2 to 15 wt % of an edible fat or oil which is also solid at room temperature or 0.2 to 15 wt % of a mixture of the emulsifier and fat or oil. The mixture is thoroughly kneaded and processed into dough by the conventional method.

Examples of the edible emulsifier that is solid at room temperature are fatty acid monoglycerides, sucrose fatty acid esters, and sorbitan fatty acid esters. Fatty acid monoglycerides are particularly preferred. Examples of the edible fat and oil that are also solid at room temperature include animal fats such as extremely hardened beef tallow and hydrogenated solid beef tallow, and vegetable oils such as extremely hardened palm oil, hydrogenated solid soybean oil and hydrogenated solid cottonseed oil. Extremely hardened beef tallow is particularly preferred. These edible emulsifiers and fats or oils that are solid at room temperature may be effectively used not only for making fried noodles but also dried Japanese noodles, hot air dried Japanese noodles, macaroni and the like, and thin skin noodles.

The edible emulsifier and oils and fats that are used in the present invention are preferably heat-fusible and in a powdered or particulate form. They preferably have melting points higher than 40° C., more preferably higher than 50° C., Their particle size preferably ranges from 10 to 80 mesh, more preferably from 30 to 60 mesh. They are desired to have a melting point higher than 40° C. in order to avoid melting by the heat of friction that occurs during the dough making process. If the particle size is less than 10 mesh, fine strands that will not break easily cannot be produced.

If the amount of the emulsifier is less than 0.2 wt %, the intended effect of increasing the separability of noodle strands is not obtained, and if the emulsifier's content exceeds 3 wt %, the residual odor of the emulsifier impairs the palatability of the final product. If the amount of the edible fat or oil is less than 0.2 wt %, the intended effect of increasing the separability of noodles strands is not attained, and if the fat (or oil) content exceeds 15 wt %, adequately long continuous strands cannot be obtained.

The resulting dough is rolled into a sheet, which is cut into strands with a slitter edge or extruded through rectangular slots. The strands are steamed for 1 to 4 minutes at 0.5–2 kg/cm$^2$. In the steaming step, the starch is gelatinized and the solid emulsifier and/or fat (or oil) is melted so as to form many tiny holes on or within the strands. The gelatinized state of gelatin is improved by the action of the emulsifier or fat (or oil). The steamed strands, after optional seasoning, are cut into lengths and dried with hot air or dehydrated by frying.

Seasoned strands are made by immersing the strands in a seasoning solution composed of seasonings, oils or fats, emulsifier and water. The seasoning solution penetrates well into the strands prepared by the present invention and the latter can be uniformly seasoned. Furthermore, the seasoned strands can be dried efficiently.

The dried strands are placed in a heat-insulating container. When boiling water is poured into the container, the noodles become ready to eat within a period of from 1 minute at the shortest to 2 minutes at the longest. The noodles are easily separable, have great soup acceptance and are highly palatable.

Before the steaming step, the edible emulsifier and/or oil or fat that is solid at room temperature is present at many locations on or within the strands, and when the strands are steamed, the emulsifier or fat (or oil) is melted to form many tiny holes on or within the strands. These holes remain intact even after the drying step, and make the strands porous. Because of this porosity, the strands can be reconstituted very quickly after pouring in boiling water. As already mentioned, the time required for noodles to become ready to eat depends on the thickness of the noodles or the distance between the noodle surface and its center. The presence of many tiny holes on or within the strands means that the distance between the surface and center of each strand is substantially decreased, and this in turn means that the time necessary for rendering the noodles ready to eat is shortened. The porosity of the noodles prepared by the present invention is due neither to the conventional leavening step nor to the inhibition of gluten formation by reduced mixing action. The noodles of the present invention have been subjected to thorough kneading action, so they are firm in texture and ensure good palatability mainly due to their high elasticity.

The emulsifier used in the present invention acts on starch to improve its gelatinized state, and at the same time, the surface activity of the emulsifier contributes greatly to achieving quick and uniform penetration of boiling water into the strands. As an attendant advantage, the noodles according to the present invention have improved soup acceptance. The emulsifier and oil or fat are also effective in decreasing the stickness of individual strands due to gelatinized starch, and therefore, the strands separate from each other very easily upon the pouring of boiling water.

As described in the foregoing, the present invention is characterized by addition of the edible emulsifier and/or fat or oil that is solid at room temperature to a mix of the other ingredients. By subjecting the mixture to the conventional noodle making process, strands having many tiny holes on their surface or in their interior are produced. The porosity due to these holes reduces the stickness of individual strands and improves the penetrability of boiling water. Upon pouring in boiling water, the strands separate from each other very quickly and the noodles become ready to eat within a very short period of time. In addition, the noodles have great soup acceptance and present improved palatability. If necessary, the attachment of separate soup powder to the noodle container may be avoided by preparing seasoned noodles. For these reasons, it is believed that the present invention will be greatly appreciated by consumers of today who have increasing preference for foods that can be served and eaten in a very short time.

While the process of the present invention has been described with particular reference to the production of instant noodles, it should be understood that the process can also be applied to many other noodles such as Japanese dried noodles, macaroni and the like, boiled noodles and thin skin noodles, as well as various ingredients to accompany instant noodles.

The present invention is hereunder described in greater detail by reference to working examples, which are given here for illustrative purposes only and are by no means intended to limit the scope of the invention.

EXAMPLE 1

To 1 kg of wheat flour, 20 g of solid fatty acid monoglyceride (30 mesh) was added and the two were intimately blended. A mixture of 350 ml of water, 20 g of sodium chloride and 2 g of Kansui (i.e. a saturated aqueous solution of sodium carbonate, potassium carbonate, sodium bicarbonate or a mixture thereof) was added to the blend of wheat flour and monoglyceride. The resulting mixture was thoroughly kneaded, and dough was prepared by the conventional method. The dough was rolled into a sheet 0.8 mm thick, which was cut into strands with a slitter edge (18/30 mm, JIS B 9201). The strands were steamed for 2 minutes at 0.8 kg/cm$^2$ and dehydrated by frying with lard for 2 minutes at 150° C. so as to prepare fried rapid-cooking noodles.

EXAMPLE 2

To 1 kg of wheat flour, 20 g of solid fatty acid monoglyceride (30 mesh) was added and the two were intimately blended. A mixture comprising 350 ml of water, 15 g of sodium chloride and 4 g of Kansui was added to the blend of wheat flour and monoglyceride. The resulting mixture was thoroughly kneaded, and dough was prepared by the conventional method. The dough was rolled into a sheet 1.0 mm thick, which was cut into strands with a slitter edge (18/30 mm, JIS B 9201). The strands were steamed for 2 minutes at 0.8 kg/cm$^2$ and dried in a mold with hot air (80° C.) for 40 minutes so as to prepare non-fried, rapid-cooking noodles.

EXAMPLE 3

To 1 kg of wheat flour, 30 g of solid fatty acid monoglyceride (30 mesh) was added and the two were intimately blended. A mixture of 350 ml of water and 30 g of sodium chloride was added to the blend of wheat flour and monoglyceride. The resulting mixture was thoroughly kneaded, and dough was prepared by the conventional method. The dough was rolled into a sheet 1.4 mm thick, which was extruded into strands through rectangular slots (10/30 mm, JIS B 9201). The strands were dried to prepare rapid-cooking noodles.

EXAMPLE 4

To 1 kg of wheat flour, 50 g of hydrogenated beef tallow (30 mesh) having a melting point of 50° C. or more was added and the two were intimately blended. A mixture of 350 ml of water, 20 g of sodium chloride and 2 g of Kansui was added to the blend of wheat flour and beef tallow. The resulting mixture was thoroughly kneaded, and dough was prepared by the conventional method. The dough was rolled into a sheet 0.8 mm thick, which was cut into strands with a slitter edge (18/30 mm, JIS B 9201). The strands were processed as in Example 1 to prepare fried, rapid-cooking noodles.

EXAMPLE 5

To 1 kg of wheat flour, 50 g of extremely hardened solid palm oil (60 mesh) was added and the two were intimately blended. A mixture of 350 ml of water, 20 g of sodium chloride and 2 g of Kansui was added to the blend of wheat flour and palm oil. The resulting mixture was thoroughly kneaded and dough was prepared by the conventional method. The dough was subsequently processed as in Example 1 to prepare fried, rapid-cooking noodles.

EXAMPLE 6

To 1 kg of wheat flour, 20 g of sucrose fatty acid ester (60 mesh) was added and the two were intimately blended. A mixture of 350 ml of water, 20 g of sodium chloride and 2 g of Kansui was added to the blend of wheat flour and fatty acid ester. The resulting mixture was thoroughly kneaded and dough was prepared by the conventional method. The dough was subsequently processed as in Example 1 to prepare fried, rapid-cooking noodles.

EXAMPLE 7

To 1 kg of wheat flour, 10 g of solid fatty acid monoglyceride (60 mesh) and 20 g of extremely hardened solid, palm oil (60 mesh) were added, and the three were intimately blended. A mixture comprising 350 ml of water, 20 g of sodium chloride and 2 g of Kansui were added to the blend of wheat flour, monoglyceride and palm oil. The resulting mixture was thoroughly kneaded and dough was prepared by the conventional method. The dough was subsequently processed as in Example 1 to prepare fried, rapid-cooking noodles.

COMPARATIVE EXAMPLE A

An intimate mixture of wheat flour (1 kg) and liquid lecithin (20 g) was blended with a mixture of 350 ml of water, 20 g of sodium chloride and 2 g of Kansui. The resulting blend was thoroughly kneaded and dough was prepared by the conventional method. The dough was subsequently processed as in Example 1 to prepare fried instant noodles.

COMPARATIVE EXAMPLE B

Wheat flour (1 kg) was blended with a mixture of 350 ml of water, 15 g of sodium chloride and 4 g of Kansui. The blend was thoroughly kneaded and dough was prepared by the conventional method. The dough was subsequently processed as in Example 2 to prepare fried instant noodles.

COMPARATIVE EXAMPLE C

Wheat flour (1 kg) was blended with a mixture of 350 ml of water and 30 g of sodium chloride. The blend was thoroughly kneaded and dough was prepared by the conventional method. The dough was subsequently processed as in Example 3 to prepare fried instant noodles.

COMPARATIVE EXAMPLE D

An intimate mixture of wheat flour (1 kg) and liquid palm oil (50 g) was blended with a mixture comprising 350 ml of water, 20 g of sodium chloride and 2 g of Kansui. The blend was thoroughly kneaded and dough was prepared by the convenient method. The dough was subsequently processed as in Example 4 to prepare fried instant noodles.

The noodle products prepared in Examples 1 to 7 and Comparative Examples A to D were checked for the separability of strands, speed of reconstitution, soup acceptance and palatability. The results are shown in the following table, together with the overall rating.

TABLE

| Sample No. | Separability of strands | Speed of reconstitution | Soup Acceptance | Palatability | Overall rating |
|---|---|---|---|---|---|
| 1 | 5 | 5 | 5 | 5 | 5 |
| 2 | 5 | 5 | 5 | 5 | 5 |
| 3 | 5 | 5 | 5 | 5 | 5 |
| 4 | 5 | 4 | 5 | 5 | 5 |
| 5 | 5 | 4 | 5 | 5 | 5 |
| 6 | 5 | 5 | 5 | 5 | 5 |
| 7 | 5 | 5 | 5 | 5 | 5 |
| A | 4 | 3 | 3 | 4 | 3 |
| B | 2 | 3 | 3 | 4 | 3 |
| C | 5 | 2 | 3 | 4 | 3 |
| D | 4 | 3 | 3 | 4 | 4 |

Index of rating: 5 ... very good, 4 ... good, 3 ... moderate, 2 ... poor, 1 ... very poor While certain representative embodiments and details have been shown for the purpose of illustrating the invention, it will be apparent to those skilled in the art that various changes and modifications may be made therein without departing from the spirit or scope of the invention.

What is claimed is:

1. A process for producing rapid-cooking, easily re-constitutable noodles, which comprises:
    (a) adding to a wheat flour mix an ingredient, wherein said ingredient is a solid at room temperature and is selected from the group consisting of emulsifiers, oils, fats and mixtures thereof, wherein said wheat flour mix comprises wheat flour, cereal meals or starch, noodle dough conditioners, food additives, seasonings and water, and further wherein said ingredient is added in a particulate form having a mesh size of from 10 to 80 mesh in an amount of from 0.2 to 3 weight percent when said ingredient is an emulsifier and from about 0.2 to 15 weight percent when said ingredient is a fat or oil, and (b) mixing the wheat flour mix and the ingredient to produce a dough,
(c) forming a product having a desired shape from said dough,
(d) heating said product by steam for a time sufficient to melt said ingredient in a particulate form to thereby form a plurality of holes in said product to increase the porosity of said product, and
(e) drying or frying said product.

2. The process of claim 1, wherein said edible emulsifier is a fatty acid monoglyceride.

3. The process of claim 1, wherein said fat or oil is extremely hardened beef tallow, hydrogenated solid beef tallow, or vegetable oils.

4. The process of claim 1, wherein said mesh size is 30 to 60.

5. The process of claim 1, wherein said ingredient has a melting point higher than 40° C.

6. The process of claim 1, wherein said heating step is conducted with steam for a time period of 1 to 4 minutes at 0.5–2 kilograms/cm$^2$.

7. A process for producing rapid-cooking, easily reconstitutable noodles, which consists essentially of (a) adding to a wheat flour mix an ingredient, wherein said ingredient is a solid at room temperature and is selected from the group consisting of extremely hardened beef tallow, hydrogenated solid beef tallow, extremely hardened palm oil, hydrogenated solid soybean oil and hydrogenated solid cottonseed oil, and mixtures thereof, wherein said wheat flour mix comprises wheat flour, cereal meals or starch, noodle dough conditioners, food additives, seasonings and water, and further wherein said ingredient is added in a particulate form having a mesh size of from 10 to 80 mesh in an amount of from 0.2 to 3 weight percent, and
(b) mixing the wheat flour mix and the ingredient to produce a dough,
(c) forming a product having a desired shape from said dough,
(d) heating said product by stream for a time sufficient to melt said ingredient in a particulate form to thereby form a plurality of holes in said product to increase the porosity of said product, and
(e) drying or frying said product.

8. The process of claim 7, wherein said ingredient is extremely hardened beef tallow.

* * * * *